United States Patent
Mokhasi

(10) Patent No.: US 11,127,068 B2
(45) Date of Patent: Sep. 21, 2021

(54) SYSTEM AND METHOD FOR COMPLETING IN-STORE TRANSACTIONS USING A MOBILE COMPUTING DEVICE

(71) Applicant: VISA INTERNATIONAL SERVICE ASSOCIATION, San Francisco, CA (US)

(72) Inventor: Gaurav Srikant Mokhasi, Bangalore (IN)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 57 days.

(21) Appl. No.: 15/644,461

(22) Filed: Jul. 7, 2017

(65) Prior Publication Data

US 2019/0012722 A1  Jan. 10, 2019

(51) Int. Cl.
*G06Q 30/06* (2012.01)
*G06Q 20/08* (2012.01)
(Continued)

(52) U.S. Cl.
CPC ....... *G06Q 30/0635* (2013.01); *G06Q 10/087* (2013.01); *G06Q 20/085* (2013.01);
(Continued)

(58) Field of Classification Search
CPC ............. G06Q 10/087; G06Q 30/0635; G06Q 20/085; G06Q 20/208; G06Q 20/3278;
(Continued)

(56) References Cited

U.S. PATENT DOCUMENTS 5,424,524 A * 6/1995 Ruppert ............... G06Q 20/387
705/17
6,725,206 B1 * 4/2004 Coveley ............. G06Q 30/0283
705/16
(Continued)

FOREIGN PATENT DOCUMENTS

EP  0623904 A1  11/1994
EP  2913807 A1   9/2015
(Continued)

OTHER PUBLICATIONS

Roussos, G. "Enabling RFID in Retail." Computer 39.3 : 25-30. ProQuest. Web (Year: 2006).*
(Continued)

*Primary Examiner* — Matthew E Zimmerman
*Assistant Examiner* — Latasha D Ramphal
(74) *Attorney, Agent, or Firm* — Loeb & Loeb, LLP

(57) ABSTRACT

Inventory management in a checkout-free store may use a combination of anti-theft tags, door sensors, a payment application on a smartphone and associated with a payment device, and a shopping cart or basket with a first communication device (e.g., a radio frequency identification ("RFID") tag, near-field communication ("NFC") device, etc.). Items selected for purchase include a second communication device. For purchase, the item may be placed near the second communication device and the payment application adds the item to a virtual shopping cart within the payment application and deactivates the first communication device. Removing an item from the electronic cart may include removing it from the virtual shopping cart and reactivating the second communication device. The payment application may also interact with the first communication device to send a message to the store inventory system and collect the item from the customer prior to exiting the store.

18 Claims, 5 Drawing Sheets

(51) Int. Cl.
*G06Q 10/08* (2012.01)
*G06Q 20/40* (2012.01)
*G06Q 20/20* (2012.01)
*G07G 1/00* (2006.01)
*G06Q 20/32* (2012.01)

(52) U.S. Cl.
CPC ....... *G06Q 20/208* (2013.01); *G06Q 20/3278* (2013.01); *G06Q 20/401* (2013.01); *G06Q 30/0643* (2013.01); *G07G 1/009* (2013.01); *G07G 1/0081* (2013.01)

(58) Field of Classification Search
CPC ............. G06Q 20/401; G06Q 30/0643; G07G 1/0081; G07G 1/009
USPC .......................................................... 705/26
See application file for complete search history.

(56) References Cited

U.S. PATENT DOCUMENTS

| | | |
|---|---|---|
| 2006/0043175 A1 | 3/2006 | Fu |
| 2008/0230603 A1* | 9/2008 | Stawar ................. B62B 3/1408 235/383 |
| 2009/0322529 A1 | 12/2009 | Kangas |
| 2010/0096450 A1 | 4/2010 | Silverbrook |
| 2012/0095853 A1* | 4/2012 | von Bose ........... G06Q 30/0633 705/16 |
| 2012/0271712 A1* | 10/2012 | Katzin ............... G06Q 20/3274 705/14.51 |
| 2014/0316919 A1* | 10/2014 | Li ........................ G06Q 20/202 705/23 |
| 2015/0242842 A1 | 8/2015 | Piva |
| 2016/0371636 A1 | 12/2016 | Douglas |
| 2017/0053273 A1 | 2/2017 | Jeong |

FOREIGN PATENT DOCUMENTS

| | | |
|---|---|---|
| WO | 2015121833 A1 | 8/2015 |
| WO | WQ-2018112021 A1 * | 6/2018 ........... G07G 1/0036 |

OTHER PUBLICATIONS

Extended European Search Report for App No. EP18829040.7, dated May 8, 2020, 8 pages.

* cited by examiner

SYSTEM AND METHOD FOR COMPLETING IN-STORE TRANSACTIONS USING A MOBILE COMPUTING DEVICE

FIELD OF THE INVENTION

The invention is directed to the in-store shopping experience in a checkout-free store, and more particularly to the problem of returning items from a shopping cart to the shelf when shopping in a checkout-free store.

BACKGROUND

The in-store checkout experience is time-consuming and cumbersome. Many disclosures have related the use of checkout-free stores in an attempt to streamline the in-store transaction process. In-store checkout processes are fairly secure as they typically require the physical presence of both the payment device and the payment device owner. Previous attempts to streamline the in-store inventory management and transaction process in a checkout-free store have led to security challenges or failures.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

Using geotagging, a payment application (e.g., the ONE VISA® application) executing on a mobile computing device (e.g., a mobile phone, watch, or other device capable of "Near Field Communication" ("NFC")) may load a store's inventory information when a user carrying the mobile computing device walks into the store. In some embodiments, the application may include securely stored payment device information on file using one or more encryption techniques. In other embodiments, the application may securely access a remote payment server and cause the remote tag, a container used to carry the items in-store such as a shopping bag, trolley, or cart includes an NFC stick. The NFC stick may the read the product RFID tag when the tag is placed in the container or otherwise brought near the NFC stick. The user may then scan the NFC stick to add items within the container to the virtual shopping cart application. When payment server to securely send payment device information to the merchant. The user may bring the mobile computing device into the store and pick up a bag or use a trolley/cart that includes one or more communication devices. Items within the store may also include NFC or RFID tags or other communications devices. The user's mobile computing device and the tags include communication devices with components and capabilities such as NFC, Radio-Frequency Identification ("RFID"), Bluetooth, WiFi, etc. In some embodiments, the store item may include a re-programmable NFC tag. The user may then use a virtual shopping cart application on a mobile computing device to scan the NFC tag and add the item to the virtual shopping cart. In further embodiments, the store item may include a static RFID tag. Where the items include an RFID tag the user walks out of the store, a scanner device may ensure that container and the virtual shopping cart both contain the same items. The cost of every item in the virtual shopping cart may then be added and charged automatically to a payment device associated with the payment application.

In some cases, the user may change his or her mind about purchasing an item while still in the store. To return the unwanted item while still in the store, the user may access the payment application and cause the application to execute instructions to remove the item from the virtual shopping cart. Where the item includes an NFC tag, the payment application may execute instructions to reactivate the NFC tag and the user may return the item to its original shelf location in the store, or to a designated returns area. Where the item includes an RFID tag, the payment application may cause the NFC stick to broadcast return instructions to an in-store computer system and remove the item from the virtual shopping cart. For example, the payment application may display an instruction to the user to place the mobile computing device or wearable next to the communication device of the shopping bag.

In other embodiments, as items are selected, the bar code or other identifying feature of the item may be scanned to capture the item identity and price and add the item to the virtual shopping cart. At the same time, the payment application may disables or deactivates the NFC tag on the item. Where a reprogrammable NFC tag is used on the item, the tag may be reactivated as the item is removed from the virtual shopping cart. Where a one-time-use, RFID tag is used, the customer may cause the payment application to communicate with a store inventory system to return the item. The communication may implement a process to confirm return of the item before leaving the store. Whether using a reprogrammable NFC tag or a static RFID tag, adding or removing the item from the virtual shopping cart may cause the payment application executing on the user computing device to send a transaction command to the in-store computer system with data for the item and an indication of the item's purchase or return.

In still other embodiments, a computer-implemented method may manage inventory and transactions in a checkout-free store. The method may receive, at an application module executing on a user computing device, an inventory list including item data corresponding to each item in the checkout-free store, and load, into a virtual shopping cart of the application module, item data corresponding to one or more selected items from the inventory list. The method may then send a transaction command to an in-store computer system responsive to receiving a selection of item data from the inventory list and cause a payment processing computer system to send payment data to the in-store computer system. Sending payment data to the in-store computer system may be responsive to: 1) a deactivation command received at one or more of an item communications device corresponding to item data corresponding to the one or more selected items and the application module, and 2) matching the item data in the virtual shopping cart to item data of the item communications device.

In still other embodiments, a system may manage inventory and transactions in a checkout-free store. The system may comprise a mobile computing device including a processor and a memory storing instructions that, when executed by the processor, cause the processor to preform several functions. For example, the processor may receive an inventory list including item data corresponding to each item in the checkout-free store and load, into a virtual shopping cart stored in the memory, item data corresponding to one or more selected items from the inventory list. The instructions may cause the processor to send a transaction command to an in-store computer system responsive to receiving a selection of item data from the inventory list and cause a payment processing computer system to send payment data to the in-store computer system. Causing the processor to send the payment data may be responsive to: 1) a deactivation command received at one or more of an item communications device corresponding to the item data corresponding to the one or more selected items and the mobile computing device, and 2) matching the item data in the virtual shopping cart to item data of the item communications device.

FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

Specification

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
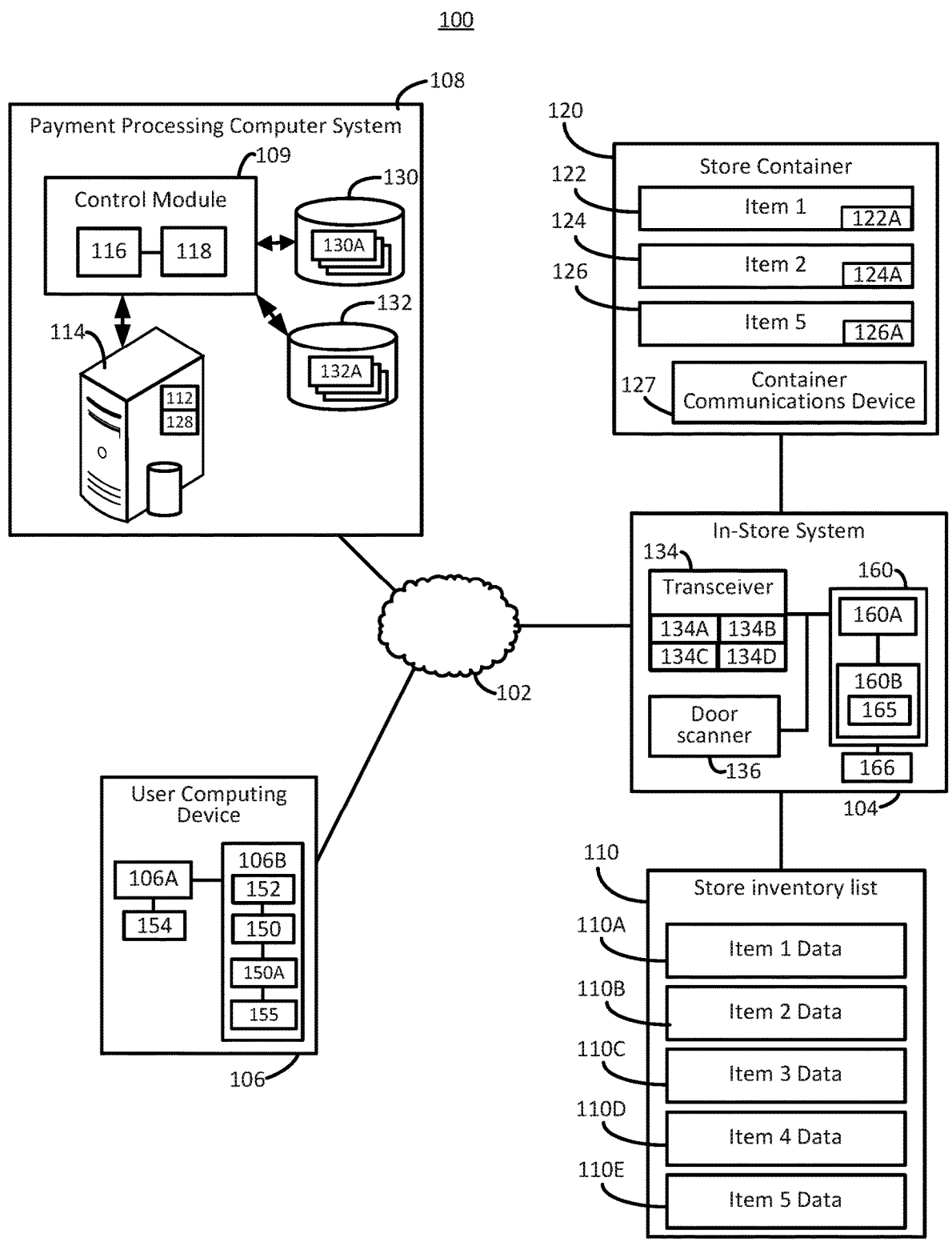
FIG. 1 shows an illustration of an exemplary system for managing the in-store inventory and transaction process in a checkout-free store.

FIG. 1 generally illustrates one embodiment of a system 100 for purchasing and returning items within a checkout-free store or a store with checkout free capabilities. The system 100 may include a computer network 102 that links one or more systems and computer components. In some embodiments, the system 100 includes an in-store payment system 104, a user computing device 106, and a payment processing computer system 108. In other embodiments, certain functions may have dedicated processors or servers that are specifically designed and built to efficiently execute the functions.

The network 102 may be described variously as a communication link, computer network, internet connection, etc. The system 100 may include various software or computer-executable instructions stored on tangible memories and specialized hardware components or modules that employ the software and instructions to securely facilitate managing the in-store inventory and transaction process within a checkout-free store of a merchant, as described herein.

The various modules may be implemented as computer-readable storage memories containing computer-readable instructions (i.e., software) for execution by one or more processors of the system 100 within a specialized or unique computing device. The modules may perform the various tasks, methods, modules, etc., as described herein. The system 100 may also include both hardware and software applications, as well as various data communications channels for communicating data between the various specialized and unique hardware and software components.

The payment processing computer system 108 may include one or more instruction modules including a control module 109 that, generally, may include instructions to cause a processor 112 of a payment processing server 114 to functionally communicate with a plurality of other computer-executable steps or modules, e.g., modules 116 and 118, and components of the system 100 via the network 102. These modules 116, 118 may include instructions that, upon loading into the server memory 128 and execution by one or more computer processors 112, facilitate managing the in-store inventory and transaction process within a checkout-free merchant store.

A first data repository 130 may include primary account holder data 130A that each include various pieces of data to describe an account of a primary account holder and user of the payment processing computer system 108. In some embodiments, primary account holder data 130A or a portion of the primary account holder data 130A may be included with a payment device 200 (FIG. 2) as a payment payload or token 132A, as described herein.

A second data repository 132 may include a plurality of payment payloads 132A that include payment information from primary account holder data 130A that may be linked by a linking module 116 to a data structure (e.g., a virtual shopping cart 150) of an application module 152 executing at the user computing device 106, as described herein. In some embodiments, one of the modules 116, 118 may include a tokenizing module (e.g., tokenizing module 118). The tokenizing module 118 may include instructions to tokenize and/or encrypt primary account holder data 130A into a payment payload 132A to be linked by the linking module 116 to the virtual shopping cart 150 and sent to the in-store computer system 104 so that a user may purchase items in a checkout-free setting.

The in-store computer system 104 may include any components that are used by a business to complete a purchase or return transaction within a checkout-free store where a customer uses a payment device 200 (FIG. 2) to complete the purchase by linking a payment payload 132A to a virtual shopping cart 150 to complete a purchase transaction for items (e.g., items 122, 124, 126, etc.) placed within the virtual shopping cart 150. For example, the system 104 may include an in-store server 160 having a further processor (e.g., an in-store server processor 160A) and a further memory (e.g., an in-store server memory 160B). The memory 160B may include processor-implemented instructions such as a transaction module 165 that is used by the system 104 to gather a payment payload data 132A, customer account information (e.g., a Personal Account Number ("PAN") 206A, Card Verification number ("CVN") 206B, etc.), and account holder data 130A, via the network 102, from the first and second data repositories 130, 132 (respectively).

The in-store computing system 104 may include a processor 160A communicably coupled to a memory 160B storing the transaction module 165. The transaction module 165 may include instructions that, when executed by the processor 160A, cause the system 104 to make data from a merchant (e.g., a store's inventory list 110 including item data 110A-E) available to other components of the system 100 (e.g., the user computing device 106, generally, and an application module 152, in particular, the payment processing computer system 108, etc.) and to facilitate managing the in-store inventory and transaction processes for a checkout-free store. Further, the transaction module 165 may include instructions to receive and process various NFC and other wireless communications as described herein from a transceiver 134 of the system 104 to facilitate managing the in-store inventory and transaction processes within a checkout-free store. For example, the module 165 may include instructions to receive an indication that a tag (e.g., 122A, 124A, 126A) corresponding to an item (e.g., 122, 124, 126) has been deactivated within the store.

Figure 4:
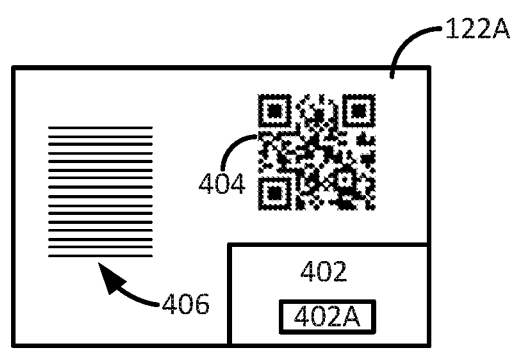
FIG. 4 is an illustration of an exemplary tag corresponding to an item within a checkout-free store.

With brief reference to FIG. 4, one example of the tags 122A, 124A, 126A, corresponding to the items 122, 124, 126, may include an item communications device 402, a visual code 404 (e.g., a barcode, a QR code, etc.), and other information 406 such as an item description, price, SKU, etc. In some embodiments, the item communications device 402 may include an RFID tag, an NFC device, or other similar device that is able to communicate item status data 402A. Where the item communications device may be programmed to send or receive different data at different times (i.e., an NFC device), the item status data 402A may include one or more indications that the item 122 corresponding to the tag 122A is in the store's inventory, has been placed within a user's virtual shopping cart 150, has been purchased or returned (e.g., a purchased status or a returned status), etc. The item status data 402A may be "pushed" from the item communication device at an interval of time or may be "pulled" from the item communication device such as when a signal is received which energized the item communication device to communicate the item status data 402A. In other embodiments, additional data may be used to invoke the communication of the item status data 402A such as GPS data, signals from BLE beacons, or other indications that the communication of the item status data 402A is appropriate. Where the item communications device 102 is static, the item status data may include communicable data about the item similar to the other information 406.

Where the item communications device 402 for the tags 122A, 124A, 126A is static and cannot be reprogrammed (e.g., an RFID tag), a store container 120 for carrying the items 122, 124, 126 while in the store may include container communications device 127 (e.g., an NFC device). In some embodiments, the container communications device 127 associated with a store trolley or basket 120 may be configured to receive a transaction command 150A indicating a purchase or a return from the user computing device 106 when for example, item data 110 corresponding to an item 122 is associated with the virtual shopping cart 150 of the application module 152 or is disassociated with the virtual shopping cart 150 (i.e., taken out). In response, the container communications device 127 may be configured to forward the transaction command 150A or associated data to the in-store computer system 104 so that a door scanner 136 or other device may be configured to determine whether items within the store container 120 and represented in the virtual shopping cart 150 match. In some embodiments, the transaction command 150A includes a message from the user computing device 106 that data representing the item 122 has been removed from a data structure corresponding to a virtual shopping cart 150 of the user computing device 106, as described herein. Where an item 122 includes a tag 122A with an item communication device 402 that is reprogrammable, the module 165 may include further instructions to send a reactivation signal to the tag 122A as well as a message indicating the item 122 should be collected for pickup and restocking within the store (e.g., a collection message).

The user computing device 106 may also include a processor 106A communicably coupled to a memory 106B. In some embodiments, the user computing device includes a smartphone. The memory 106B may store an application module 152. The application module 152 may include instructions to facilitate purchasing and returning items in a checkout-free store, as described herein. In some embodiments, the instructions may include receiving a store's inventory list 110, loading and displaying the inventory list 110 and corresponding item data (e.g., item data 110A-E) on the user's computing device 106, instantiating a virtual shopping cart 150 for display of data corresponding to the application module 152 and virtual shopping cart 150 in a user interface 154 of the user computing device 106, sending a transaction command 150A to a container communications device 127, transferring payment information such as a payment payload or token 132A to the in-store system 104 via the payment processing system 108, and facilitating removal of item data (e.g., item data 110A-E) corresponding to an item (e.g., 122, 124, 126, etc.) from the virtual shopping cart 150.

Figure 2A:
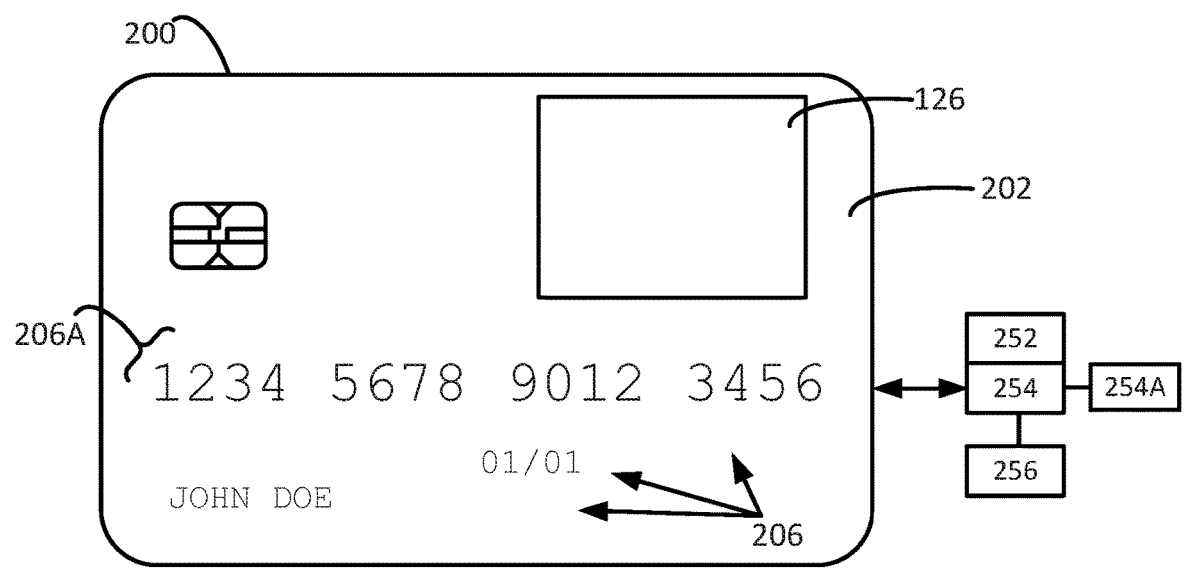
FIGS. 2A and 2B show an illustration of an exemplary payment device that may be used with the system of FIG. 1.
Figure 2B:
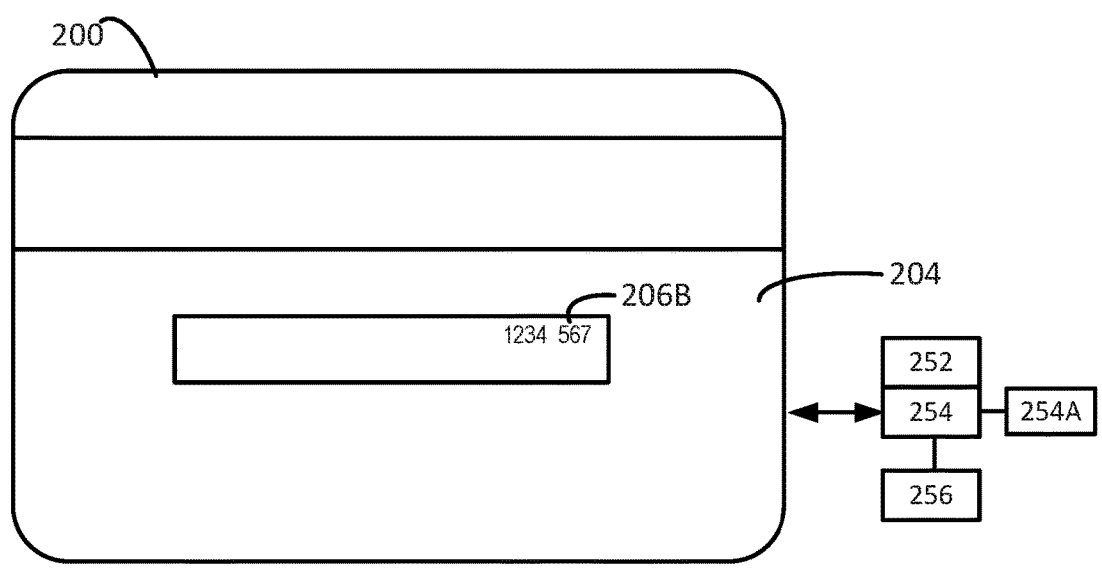

With brief reference to FIGS. 2A and 2B, an exemplary payment device 200 (FIGS. 2A and 2B) may take on a variety of shapes and forms. In some embodiments, the payment device 200 is a traditional card such as a debit card or credit card. In other embodiments, the payment device 200 may be a fob on a key chain, an NFC wearable, or other device. As long as the payment device 200 is able to communicate securely with the system 100 and its components (e.g., the payment processing computer system 108, the in-store computer system 104, and the user computing device 106, etc.) the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 including a personal account number (PAN) 206A and the card verification number (CVN) 206B. In some embodiments, the payment device 200 may include data corresponding to the primary account holder, such as a primary account holder data 130A for the primary account holder. A memory 254 generally and a module 254A in particular may be encrypted such that all data related to payment is secure from unwanted third parties. A communication interface 256 may include instructions to facilitate sending payment data 155, a payment payload 132A, a payment token, or other data to identify payment information to the in-store computer system 104 and/or the payment processing computer system 108 via the network 102.

Figure 3B:
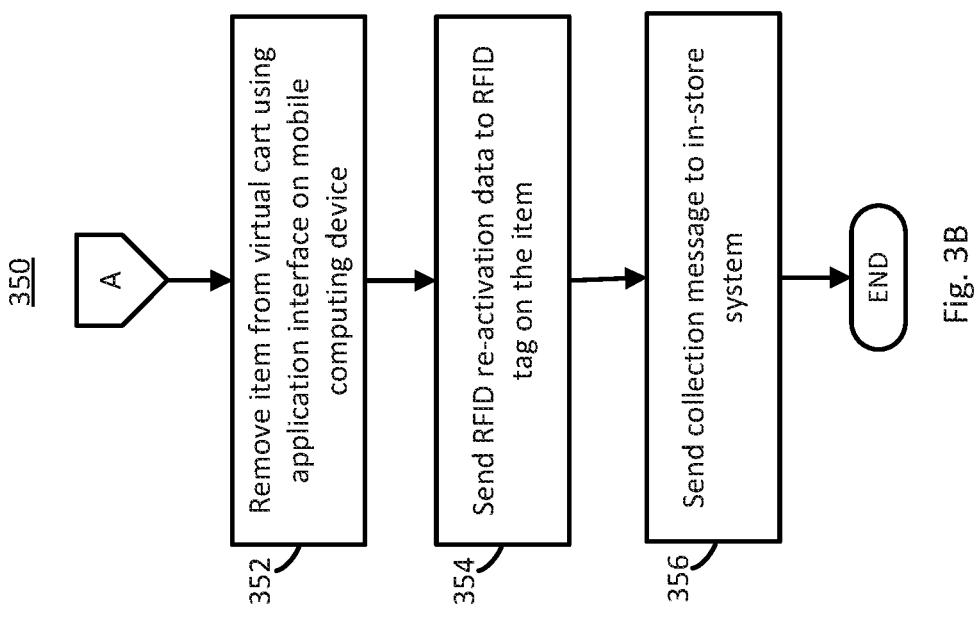
FIGS. 3A and 3B show flowcharts for processes that may be used for managing the in-store inventory and transaction process in a checkout-free store.

With reference to FIG. 3, a method 300 facilitates managing the in-store inventory and transaction processes with a checkout-free merchant. Each step of the method may be performed on a server or other computing device including instructions that, when executed by a processor, perform the action or block described herein.

At block 302, the method 300 may download an application module 152 that facilitates the in-store inventory and transaction processes for items (e.g., items 122, 124, 126, etc.) within a checkout-free store. In some embodiments, a processor 106A of the user computing device 106 may execute instructions to access an application store or other website via the network 102. The application store may include a copy of the application module 152. The processor 106A may then execute instructions to send a request to retrieve the application module 152 and save it to the memory 106B.

At block 304, the user computing device 106 may execute instructions of the application module 152 to load a store inventory list 110 into the memory 106B. In some embodiments, the user computing device 106 including the application module 152 may be brought within communication proximity of a merchant store including the in-store computing system 104. The transceiver 134 of the in-store computer system 104 may broadcast or push a connection message 134A to the network 102. Of course, in some embodiments, the connection message 134A may be pulled from the transceiver 134 of the in store computer system 104. The connection message 134A may include the store inventory list 110 and be received by the user computing device 106. Once received, the application module 152 may process the item data 110A-E from the store inventory list 110 for display within the user interface 154.

At block 306, the method 300 may execute instructions to load item data (e.g., 110A-E) corresponding an item (e.g., 122, 124, 126) selected by the user into the virtual cart 150 of the application module 152. In some embodiments (e.g., where the item communications device 402 is not reprogrammable), loading item data 110A-E corresponding to the selected items into the virtual shopping cart 150 may cause the application module 152 to send a transaction command 150A to the container communications device 127.

In response to receiving the transaction command 150A at the container communications device 127, one or more of the application module 152 or the container communications device may send the transaction command 150A indicating purchase of the item 122 to the in-store computer system 104. In further embodiments (e.g., where the item communications device 402 is reprogrammable), loading item data 110A-E into the virtual shopping cart 150 may cause the application module 152 to send a transaction command 150A to the in-store computer system 104. In response to receiving the transaction command 150A at the in-store computer system 104, the transaction module 165 may send a deactivation command 1348 indicating purchase of the item 122.

Where the item communications device 402 is not reprogrammable (i.e., an RFID tag), the transaction module 165 may send the deactivation command 1348 to the container communications device 127 which may then be read by the application module 152. Where the item communications device 402 is reprogrammable, the transaction module 165 may send the deactivation command 1348 directly to the item communications device 402. The deactivation command 1348 may cause the item status data 402A of the tag 122A to indicate that the item 122 has been purchased.

Figure 3A:
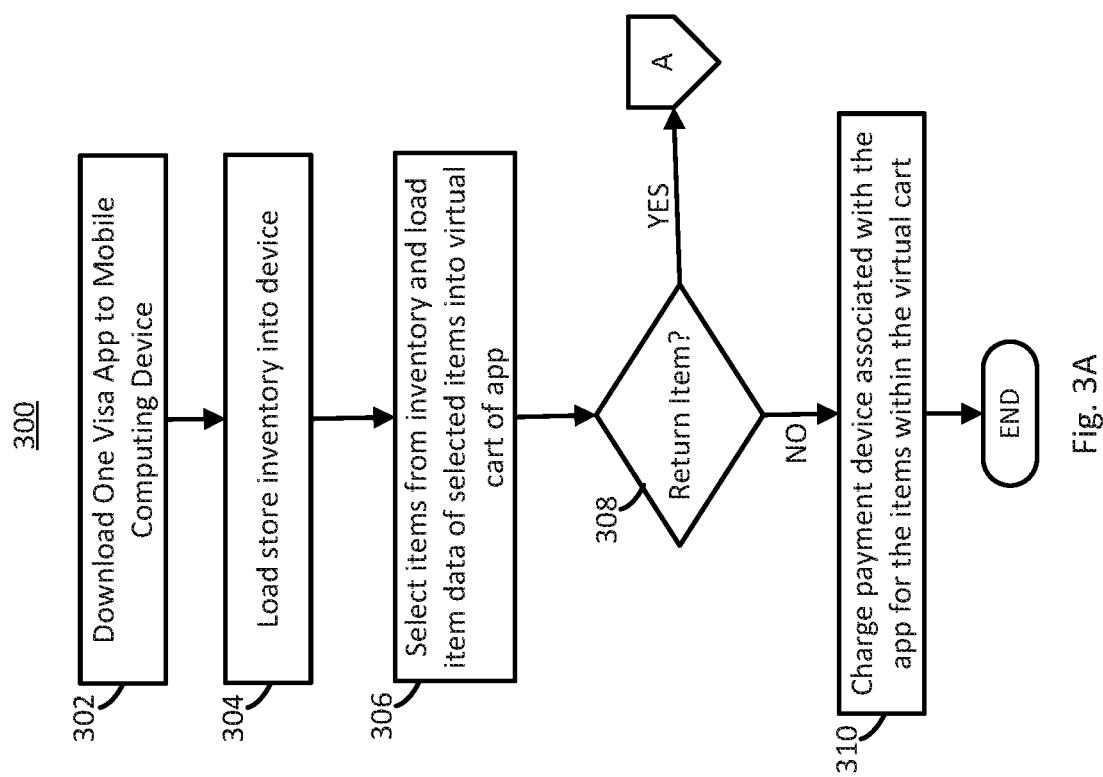

At block 308, the method may execute instructions to determine if the item 122 has been returned. With reference to FIG. 3A, at block 352, the user may cause the item data 110A for the item 122 to be disassociated with (e.g., deleted from) the virtual shopping cart 150 using the user interface 154. In some embodiments, causing the item data 110A corresponding to the item 122 to be disassociated with a virtual shopping cart 150 of the application module 152 may cause the processor 106A of the user computing device 106 to execute instructions of the application module 152 to send a transaction command 150A indicating return of the item 122 to the in-store computer system 104.

At block 354, in response to receiving the transaction command 150A, the transceiver 134 of the in-store computer system 104 may send an activation command 134C to the second communication device 402 of the tag 122A. The activation command 134C may cause the item status data 402A of the tag 122A to indicate that the item 122 has been returned. At block 356, sending the activation command 134C to the second communication device 402 of the tag 122A may also cause the in-store computer system 104 to send a collection message 134D to an in-store alert display 166 to inform store personnel to collect the returned item.

At block 310, the method 300 may execute instructions to complete the purchase of items 122, 124, 126 placed within the trolley/basket 120 and/or associated with the virtual cart 150 by charging a payment device 200 associated with the application module 152 for the items 122, 124, 126. In some embodiments, the application module 152 may include an instruction to send payment data 155 directly to the in-store computer system 104. The payment data 155 may be encrypted as a token that may only be processed by the in-store computer system 104. In other embodiments, the application module 152 may cause the processor to execute an instruction to direct a module of the payment processing computer system 108 to securely send a payment payload 132A to the in-store computer system. In further embodiments, a door scanner 136 or other device within the store may sense item status data 402A from one or more items (e.g., 122, 124, 126, etc.).

When the data 402A indicates a corresponding item is purchased, then the method 300 may confirm that one or more of the payment processing computer system 108 or the application module 152 executing on the user computing device 106 has forwarded payment data 155 or a payment payload 132A to the in store system 102 via the network 102 to complete a purchase transaction for the items. In further embodiments, when the data 402A indicates a corresponding item is not purchased, then the method 300 may cause one or more of the payment processing computer system 108 or the application module 152 executing on the user computing device 106 to forward payment data 155 or a payment payload 132A to the in store system 102 via the network 102 to complete a purchase transaction for the items.

Figure 5:
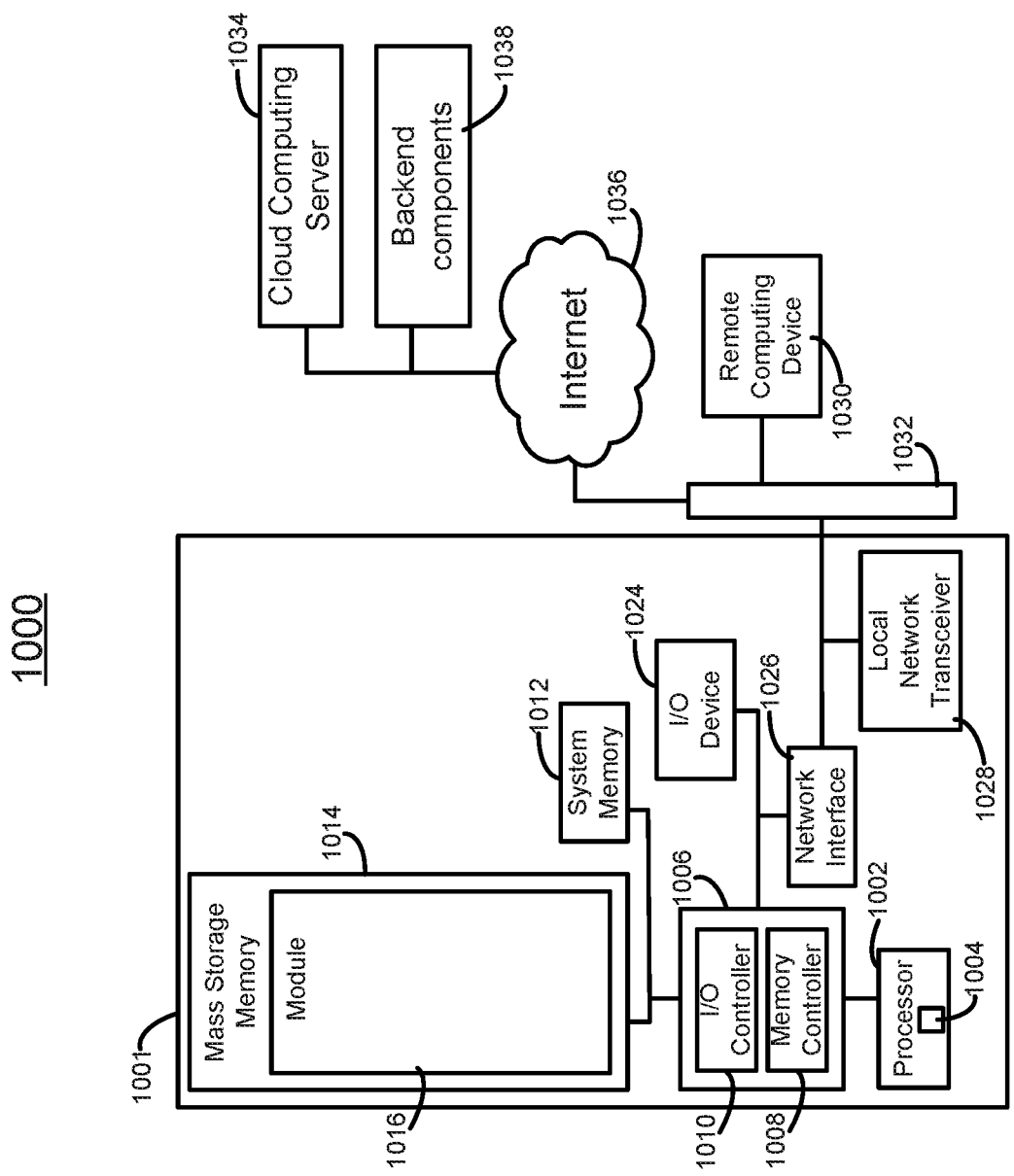
FIG. 5 shows an exemplary computing device that may be physically configured to execute the methods described herein.

FIG. 5 is a high-level block diagram of an example computing environment 1000 for the system 100 and method 300 for purchasing and returning items in a checkout-free store, as described herein. The computing device 1001 may include a server (e.g., the payment processing server 114, a mobile computing device (e.g., user computing device 106), a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods described herein may be used to implement and execute the example systems of FIG. 1 and methods of FIGS. 3A and 3B. Although the example system 1000 is described below as including a plurality of peripherals, interfaces, chips, memories, etc., one or more of those elements may be omitted from other example processor systems used to implement and execute the example systems and methods. Also, other components may be added.

As shown in FIG. 5, the computing device 1001 includes a processor 1002 that is coupled to an interconnection bus. The processor 1002 includes a register set or register space 1004, which is depicted in FIG. 5 as being entirely on-chip, but which could alternatively be located entirely or partially off-chip and directly coupled to the processor 1002 via dedicated electrical connections and/or via the interconnection bus. The processor 1002 may be any suitable processor, processing unit or microprocessor. Although not shown in FIG. 5, the computing device 1001 may be a multi-processor device and, thus, may include one or more additional processors that are identical or similar to the processor 1002 and that are communicatively coupled to the interconnection bus.

The processor 1002 of FIG. 5 is coupled to a chipset 1006, which includes a memory controller 1008 and a peripheral input/output (I/O) controller 1010. As is well known, a chipset typically provides I/O and memory management functions as well as a plurality of general purpose and/or special purpose registers, timers, etc. that are accessible or used by one or more processors coupled to the chipset 1006. The memory controller 1008 performs functions that enable the processor 1002 (or processors if there are multiple processors) to access a system memory 1012 and a mass storage memory 1014, that may include either or both of an in-memory cache (e.g., a cache within the memory 1012) or an on-disk cache (e.g., a cache within the mass storage memory 1014).

The system memory 1012 may include any desired type of volatile and/or non-volatile memory such as, for example, static random access memory (SRAM), dynamic random access memory (DRAM), flash memory, read-only memory (ROM), etc. The mass storage memory 1014 may include any desired type of mass storage device. For example, the computing device 1001 may be used to implement a module 1016 (e.g., the various modules as herein described). The mass storage memory 1014 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 1001, the system 100, and method 300. Thus, a module, block, function, operation, procedure, routine, step, and method can be implemented in hardware, firmware, and/or software. In one embodiment, program modules and routines are stored in mass storage memory 1014, loaded into system memory 1012, and executed by a processor 1002 or can be provided from computer program products that are stored in tangible computer-readable storage mediums (e.g. RAM, hard disk, optical/magnetic media, etc.).

The peripheral I/O controller 1010 performs functions that enable the processor 1002 to communicate with a peripheral input/output (I/O) device 1024, a network interface 1026, a local network transceiver 1028, (via the network interface 1026) via a peripheral I/O bus. The I/O device 1024 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 1024 may be used with the module 1016, etc., to receive data from the transceiver 1028, send the data to the components of the system 100, and perform any operations related to the methods as described herein.

The local network transceiver 1028 may include support for a Wi-Fi network, Bluetooth, Infrared, cellular, or other wireless data transmission protocols. In other embodiments, one element may simultaneously support each of the various wireless protocols employed by the computing device 1001. For example, a software-defined radio may be able to support multiple protocols via downloadable instructions. In operation, the computing device 1001 may be able to periodically poll for visible wireless network transmitters (both cellular and local network) on a periodic basis. Such polling may be possible even while normal wireless traffic is being supported on the computing device 1001. The network interface 1026 may be, for example, an Ethernet device, an asynchronous transfer mode (ATM) device, an 802 wireless interface device, a DSL modem, a cable modem, a cellular modem, etc., that enables the system 100 to communicate with another computer system having at least the elements described in relation to the system 100.

While the memory controller 1008 and the I/O controller 1010 are depicted in FIG. 5 as separate functional blocks within the chipset 1006, the functions performed by these blocks may be integrated within a single integrated circuit or may be implemented using two or more separate integrated circuits. The computing environment 1000 may also implement the module 1016 on a remote computing device 1030. The remote computing device 1030 may communicate with the computing device 1001 over an Ethernet link 1032. In some embodiments, the module 1016 may be retrieved by the computing device 1001 from a cloud computing server 1034 via the Internet 1036. When using the cloud computing server 1034, the retrieved module 1016 may be programmatically linked with the computing device 1001. The module 1016 may be a collection of various software platforms including artificial intelligence software and document creation software or may also be a Java® applet executing within a Java® Virtual Machine (JVM) environment resident in the computing device 1001 or the remote computing device 1030. The module 1016 may also be a "plug-in" adapted to execute in a web-browser located on the computing devices 1001 and 1030. In some embodiments, the module 1016 may communicate with back end components 1038 via the Internet 1036.

The system 1000 may include but is not limited to any combination of a LAN, a MAN, a WAN, a mobile, a wired or wireless network, a private network, or a virtual private network. Moreover, while only one remote computing device 1030 is illustrated in FIG. 5 to simplify and clarify the description, it is understood that any number of client computers are supported and can be in communication within the system 1000.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method of managing inventory and transactions in a checkout-free store, the method comprising:

receiving, at an application module executing on a user computing device, an inventory list including item data corresponding to each item in the checkout-free store;

loading, into a virtual shopping cart of the application module, the item data for one or more selected items from the inventory list, the virtual shopping cart representing a store container that carries the one or more selected items from the inventory list, wherein the store container includes a container communications device that is communicably coupled to item communications devices affixed to each of the one or more selected items from the inventory list;

sending a transaction command to an in-store computer system responsive to receiving a selection of the item data for the one or more selected items from the inventory list; and sending from a payment processing computer system payment data for the one or more selected items from the inventory list to the in-store computer system responsive to:
  receiving the transaction command at the container communications device from the application module executing on the user computing device, the transaction command including the item data for the one or more selected items from the inventory list,
  forwarding the transaction command from the container communications device to the in-store computer system, and
  matching the item data for the one or more selected items from the inventory list that is loaded into the virtual shopping cart to the item data for the one or more selected items from the inventory list carried by the store container;

disassociating, from the virtual shopping cart, a selected item of the one or more selected items from the inventory list using a user interface of the application module executing on the user computing device; and sending an activation command from the in-store computer system to the item communications device affixed to the selected item of the one or more selected items from the inventory list responsive to receiving the transaction command from the application module executing on the user computing device, the transaction command indicating: 1) return of the selected item, and 2) disassociation of the selected item from the virtual shopping cart using the user interface of the application module executing on the user computing device;

wherein the item communications device includes a static RFID (radio-frequency identification) tag or a reprogrammable NFC (near-field communication) tag.

2. The method of claim 1, further comprising sending, from the application module executing on the user computing device to the in-store computer system, the transaction command indicating return of an item corresponding to the item data.

3. The method of claim 2, wherein the activation command causes item status data corresponding to the item data to indicate a returned status.

4. The method of claim 1, wherein receiving, at the application module executing on the user computing device, the inventory list including the item data corresponding to each item in the checkout-free store includes pushing, from a transceiver of the in-store computing system, a connection message to a computer network, the connection message including the inventory list.

5. The method of claim 1, wherein loading, into the virtual shopping cart of the application module, the item data for the one or more selected items from the inventory list includes sending the transaction command from the application module to the container communications device corresponding to a container holding the one or more selected items.

6. The method of claim 5, further comprising, in response to receiving the transaction command at the container communications device, sending from one or more of the application module or the container communications device the transaction command to the in-store computer system and to send the payment data for the one or more selected items to the in-store computer system.

7. The method of claim 6, further comprising, in response to sending the transaction command to the in-store computer system, receiving a deactivation command at the one or more of the application module or the container communications device.

8. The method of claim 7, wherein the deactivation command indicates item status data corresponding to the one or more selected items that the one or more selected items are purchased.

9. The method of claim 8, further comprising encrypting the payment data for the one or more selected items before sending the payment data to the in-store computer system.

10. A system for managing inventory and transactions in a checkout-free store, the system comprising:
a mobile computing device including a processor and a memory storing instructions that, when executed by the processor, cause the processor to:
receive, at an application module executing on a user computing device, an inventory list including item data corresponding to each item in the checkout-free store;
load, into a virtual shopping cart of the application module, the item data for one or more selected items from the inventory list, the virtual shopping cart representing a store container that carries the one or more selected items from the inventory list, wherein the store container includes a container communications device that is communicably coupled to item communications devices affixed to each of the one or more selected items from the inventory list;
send a transaction command to an in-store computer system responsive to receiving a selection of the item data for the one or more selected items from the inventory list; and
sending from a payment processing computer system payment data for the one or more selected items from the inventory list to the in-store computer system responsive to:
receiving the transaction command at the container communications device from the application module executing on the user computing device,
the transaction command including the item data for the one or more selected items from the inventory list,
forwarding the transaction command from the container communications device to the in-store computer system, and
matching the item data for the one or more selected items from the inventory list that is loaded into the virtual shopping cart to the item data for the one or more selected items from the inventory list carried by the store container;
disassociate, from the virtual shopping cart, a selected item of the one or more selected items from the inventory list using a user interface of the application module executing on the user computing device; and
send an activation command from the in-store computer system to the item communications device affixed to the selected item of the one or more selected items from the inventory list responsive to receiving the transaction command from the application module executing on the user computing device, the transaction command indicating: 1) return of the selected item, and 2) disassociation of the selected item from the virtual shopping cart using the user interface of the application module executing on the user computing device;
wherein the item communications device includes a static RFID (radio-frequency identification) tag or a reprogrammable NFC (near-field communication) tag.

11. The system of claim 10, wherein the memory includes further instructions to send, to the in-store computer system, the transaction command indicating return of an item corresponding to the item data.

12. The system of claim 11, wherein the activation command causes item status data at the container communications device the item data for the one or more selected items to indicate a returned status.

13. The system of claim 12, wherein the further memory includes further instructions to push, from a transceiver of the in-store computer system, a connection message to a computer network, the connection message including the inventory list.

14. The system of claim 13, wherein the memory includes further instructions to send the transaction command from the mobile computing device to the container communications device corresponding to a container holding the one or more selected items.

15. The system of claim 14, wherein the memory includes further instructions to send the transaction command to the in-store computer system and to send payment data for the one or more selected items to the in-store computer system in response to executing the instructions to send the transaction command to the container communications device.

16. The system of claim 15, wherein the memory includes further instructions to receive a deactivation command.

17. The system of claim 16, wherein the deactivation command indicates item status data corresponding to the one or more selected items that the one or more selected items are purchased.

18. The system of claim 17, wherein the memory includes further instructions to encrypt the payment data for the one or more selected items.

* * * * *